United States Patent
Gruber

[11] 3,713,583
[45] Jan. 30, 1973

[54] BEVERAGE FOUNTAIN STRUCTURE

[76] Inventor: Alvin Gruber, 2215 Disston Street, Philadelphia, Pa. 19149

[22] Filed: Sept. 17, 1970

[21] Appl. No.: 73,003

[52] U.S. Cl. ............................ 239/17, 239/24
[51] Int. Cl. .................................... B05b 17/08
[58] Field of Search .......... 239/16, 17, 18, 20, 22, 23, 239/24, 28; 220/23; D44/1

[56] References Cited

UNITED STATES PATENTS

| | | | |
|---|---|---|---|
| 1,651,714 | 12/1927 | Kern | 239/17 |
| 3,022,010 | 2/1962 | Barnett | 239/17 |
| 3,078,005 | 2/1963 | Lewerth | D44/1 |
| 3,154,853 | 11/1964 | Dubbeld | D44/1 |
| 3,476,282 | 11/1969 | Monaco et al | 220/23.6 |
| 871,191 | 11/1907 | Southam | 239/23 |
| 3,451,622 | 6/1969 | Forney | 239/23 X |
| 2,785,895 | 3/1957 | Neveling | 239/23 X |
| 2,745,641 | 5/1956 | Jacobs | 239/24 X |

FOREIGN PATENTS OR APPLICATIONS

| | | | |
|---|---|---|---|
| 664,263 | 8/1929 | France | 239/16 |

*Primary Examiner*—Lloyd L. King
*Attorney*—Jacob Trachtman

[57] ABSTRACT

A beverage fountain including a plurality of bowls mounted in spaced relation one above the other. The bowls are of decreasing size with the bottommost bowl being the largest. Means is provided for pumping a beverage from the bottommost bowl to the topmost bowl and each of the bowls above the bottommost bowl has means for allowing the beverage to flow in streams from its sides to the next lower bowl to form a fountain of the beverage. The fountain includes means for preventing the beverage from splashing as it is pumped into the topmost bowl.

10 Claims, 5 Drawing Figures

PATENTED JAN 30 1973 3,713,583
SHEET 1 OF 2
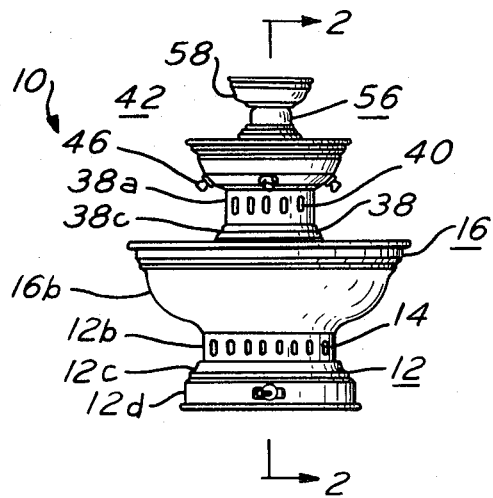
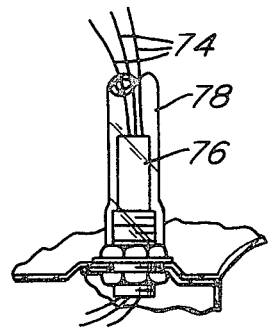
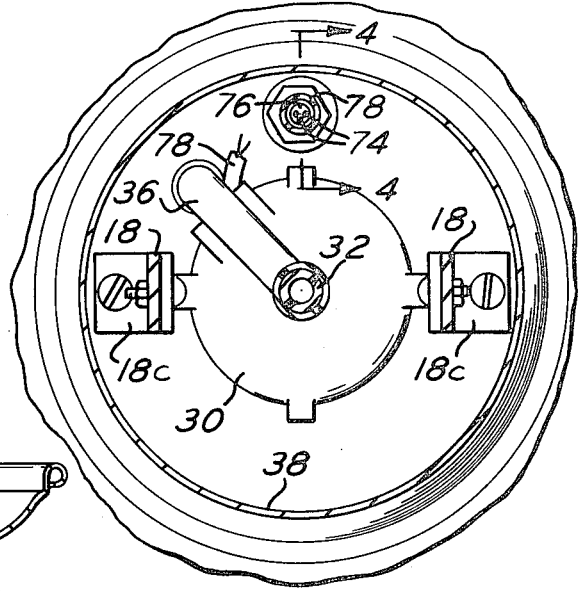
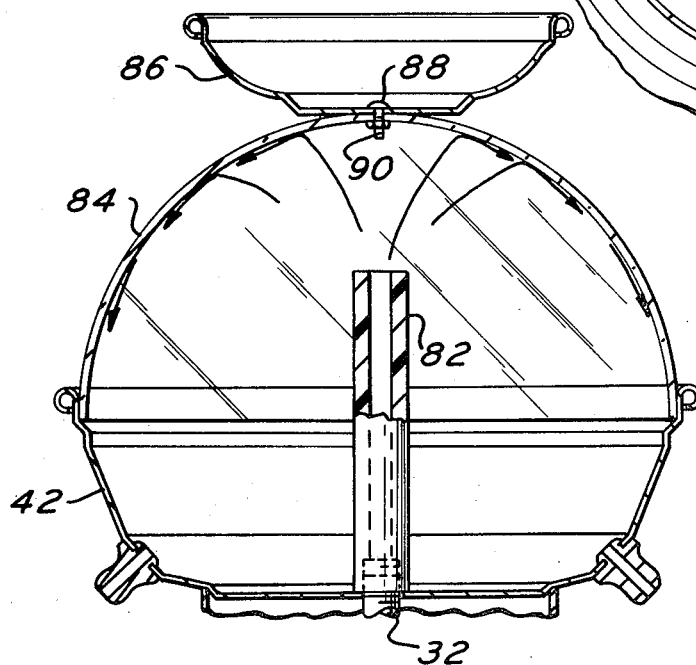
INVENTOR
ALVIN GRUBER
BY Jacob Trachtman
ATTORNEY

BEVERAGE FOUNTAIN STRUCTURE

The present invention relates to a beverage fountain, and more particularly to a beverage fountain which prevents splashing of the beverage.

Beverage fountains are used at parties or banquets as a decorative means for serving a beverage, such as punch, champagne or the like. Such fountains generally include a plurality of bowls mounted in spaced relation one above the other with the bowls being of decreasing size from the largest bottommost bowl. A pump is provided for pumping the beverage from the bottommost bowl to the top bowl through a pipe or tube. Each of the bowls above the bottommost bowl includes means for allowing the flow therefrom in a plurality of streams into the next lower most bowl. The falling streams of the beverage provide the fountain effect and the beverage returning to the bottommost bowl is recirculated by the pump. A person desiring some of the beverage can place a cup or glass under one of the streams to fill the cup or glass. A problem which has arisen with some of these beverage fountains is that the force of the beverage as it is pumped from the pipe or tube into the upper bowl often causes a splashing of the beverage. This splashing of the beverage can not only adversely effect the decorative affect of the fountain but also can cause some of the beverage to bounce out of the bowl onto the table or floor around the fountain or even onto a person who is obtaining some of the beverage.

It is therefore an object of the present invention to provide a novel beverage fountain.

It is another object of the present invention to provide a splashless beverage fountain.

It is still another object of the present invention to provide a beverage fountain in which the flow of the beverage into the upper bowl is confined so as to prevent splashing of the beverage from the bowl.

It is a further object of the present invention to provide a beverage fountain in which the flow of the beverage into the upper bowl is confined in a manner so as to prevent splashing of the beverage from the bowl yet provides an additional decorative effect to the fountain.

These objects are achieved by a beverage fountain which includes a plurality of bowls mounted in spaced relation one above the other. The bowls are of decreasing size with the bottommost bowl being the largest. Pump means is provided to pump the beverage from the bottommost to an upper bowl. Means is provided where the beverage enters the upper bowl to confine the beverage and prevent the beverage from splashing from the upper bowl. Each bowl includes means for allowing the beverage to flow therefrom in streams and fall into the next lowermost bowl.

The foregoing and other objects of the invention will become more apparent as the following detailed description of the invention is read in conjunction with the drawings, in which:

FIG. 1 is a side plan view of one form of the beverage fountain of the present invention.

FIG. 3 is a sectional view taken along line 3–3 of FIG. 2.

FIG. 4 is a sectional view taken along line 4–4 of FIG. 3, and

FIG. 5 is a sectional view of the top portion of another form of the beverage fountain.

Like reference numerals designate like parts throughout the several views.

Figure 2:
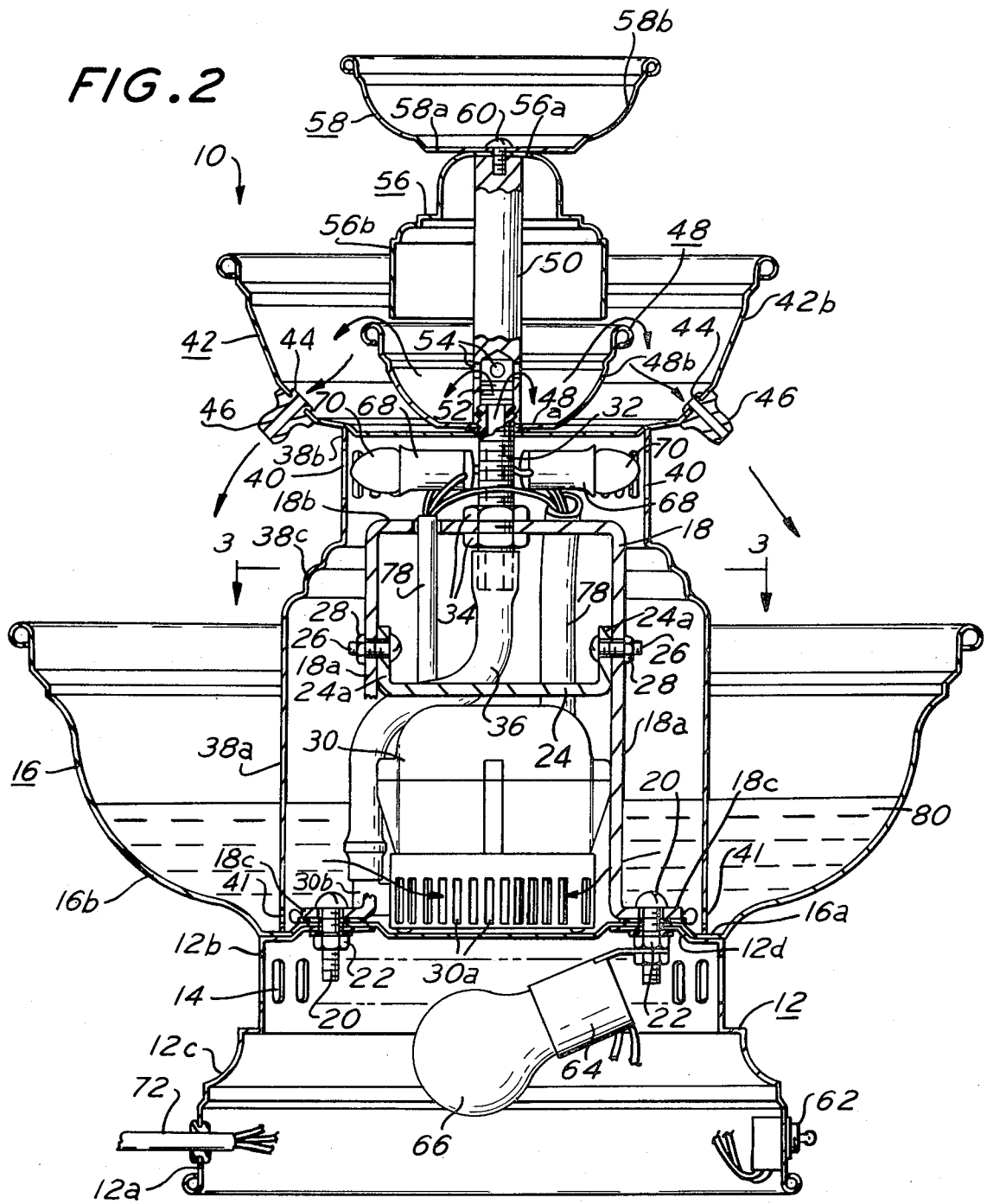
FIG. 2 is a sectional view taken along line 2–2 of FIG. 1.

Referring initially to FIG. 1–4, one form of the beverage fountain of the present invention is generally designated as 10. Fountain 10 comprises a sheet metal base 12 having a cylindrical lower wall portion 12a, a cylindrical upper wall portion 12b smaller in diameter than the lower wall portion 12a and a stepped intermediate portion 12c connecting the lower and upper wall portion 12c and 12b. An annular supporting flange 12d extends radially inwardly from the upper edge of the upper wall portion 12b (see FIG. 2). The upper wall portion 12b has a plurality of circumferentially spaced, vertically elongated holes 14 therethrough.

A large sheet metal beverage bowl 16 is mounted on the base 12. The bowl 16, has a circular bottom surface 16a and a substantially semi-spherical center wall 16b extending upwardly from the edge of the bottom surface. The bottom surface 16a is of the same diameter as the upper wall portion 12b of the base 12 and is seated on the supporting flange 12d of the base.

A U-shaped metal mounting bracket 18 is mounted on the bottom surface of the bowl 16 and projects upwardly therefrom (See FIG. 2). The mounting bracket 18 has a pair of spaced, parallel, vertically extending arms 18a—18a connected together at their upper ends by a top portion 18b. Mounting flanges 18c project horizontally outwardly from the bottom ends of the arms 18a and are seated on the bottom surface 16a of the bowl 16. Bolts 20 extend through aligned holes in the mounting flanges 18c, the bottom surface 16c of the bowl 16 and the supporting flanges 12d of the base 12. Nuts 22 are threaded on the bolts 20 to secure the mounting bracket 18 and the bowl 16 to the base 12. Washers 23 are provided around the bolts 20 between the flanges 18c and the bottom surface 16a of the bowl 16 to seal the openings around the bolts. The arms 18a of the mounting bracket 18 are of a length longer than the depth of the bowl 16 so that the top portion 18b of the mounting bracket 18 is vertically above the top edge of the bowl 16. A brace 24 extends horizontally between the arms 18a of the mounting bracket 18 and has upwardly extending flanges 24a on its ends which engage the arms 18a. Bolts 26 extend through aligned holes in the brace flanges 24a and the arms 18a. Nuts 28 are threaded on the bolts 26 to secure the brace 24 to the mounting bracket 18.

An electrically driven pump 30 is mounted on the center of the bottom surface 16a of the bowl 16 between the arms 18a of the mounting bracket 18. The pump 30 has a plurality of circumferentially spaced inlet openings 30a in the bottom of its casing and an outlet port 30b projecting outwardly from its casing. A threaded pipe 32 extends vertically through a hole in the top portion 18b of the mounting bracket 18. A pair of nuts 34 are threaded on the pipe 32 at opposite sides of the mounting bracket top portion 18b to secure the pipe 32 to the mounting bracket 18. A flexible tube 36 has one end fitting on the outlet port 30b of the pump 30 and its other end fitting on the bottom end of the pipe 32 so as to connect the pipe 32 to the outlet of the pump 30.

A sheet metal cover post 38 is seated on the bottom surface of the bowl 16 and surrounds the mounting bracket 18. The cover post 38 has a cylindrical lower portion 38a, a cylindrical upper portion 38b which is smaller in diameter than the lower portion 38a, and a stepped intermediate portion 38c connecting the lower and upper portions 38a and 38b. The lower portion 38a is of a height slightly longer than the depth of the bowl 16, and the upper portion 38b extends vertically to a point slightly below the top end of the pipe 32. The upper portion 38b has a plurality of circumferentially spaced, vertically elongated openings 40 therethrough. The lower portion 38a has a plurality of circumferentially spaced holes 41 therethrough adjacent its bottom end.

A second beverage bowl 42 is mounted on the cover post 38. The bowl 42 has a circular bottom surface 42a and a substantially semi-spherical outer wall 42b extending upwardly from the edge of the bottom surface 42a. The bottom surface 42a of the bowl 42 is of a diameter so as to fit in and rest on the upper end of the cover post 38, and the bowl 38 is smaller than the bottom bowl 16. The bottom surface 42a has a hole through the center thereof through which the top end of the pipe 32 extends. The outer wall 42b has a plurality of circumferentially spaced holes 44 therethrough slightly above the bottom surface 42a A spout 46 is secured to the outer surface of the outer wall 42b at each of the holes 44. The spouts 46 are directed downwardly toward the lower bowl 16.

A deflector cup 48 is seated within the bowl 42 on the bottom surface 42a. The cup 48 has a circular bottom 48a and a substantially semi-spherical outer wall 48b extending upwardly from the edge of the bottom surface 48a. The cup 48 is of a diameter and height less than that of the bowl 42. The bottom surface 48a has a hole in the center thereof through which the top end of the pipe 32 extends. A cylindrical rod 50 has a threaded, blind hole 52 in one end thereof and a plurality of circumferentially spaced holes 54 extending radially therethrough adjacent the blind end of the hole 52. The end of the rod 50 is threaded around the top end of the pipe 32 until the end of the rod tightly engages the bottom surface 48a of the cup and secures the bowl 42 and the cup 48 to the cover post 38. The hole 52 is of a length so that the holes 54 open into the cup 48 below its rim. The rod 50 is of a length longer than the depth of the bowl 42 so that the rod extends vertically above the rim of the bowl 42.

A sheet metal dome member 56 has a top surface 56a seated on the top end of the rod 50 and an outer wall 56b extending downwardly to the rim of the cup 48. The bottom end of the outer wall 56b is smaller in diameter than the upper edge of the outer wall 48b of the cup 48. A dish 58 having a bottom surface 58a and an upwardly extending outer wall 58b is seated on the top surface 56a of the dome member 56. A screw 60 extends through the center of the dish bottom surface 58a and the dome member top surface 56a and is threaded onto the top end of the rod 50 to secure the dome member 56 and the dish 58 to the rod 50.

A switch 62 is mounted on the lower wall portion 12a of the base 12. A bulb socket 64 is mounted within the base 12 on one of the bolts 20 and contains a light bulb 66. A pair of light bulb sockets 68 are mounted on the top portion 18b of the mounting bracket 18 and within the upper portion 38b of the cover post 38. Each of the light bulb sockets 68 contains a light bulb 70. A cable 72 having a plug (not shown) on its outer end extends into the base 12 through the lower wall portion 12a. The light bulb sockets 64 and 68, the motor of the pump 30 and the switch 62 are electrically connected in series with the cable 72. As shown in FIGS. 3 and 4, the wires 74 which connect the cable 72 to the motor of the pump 30 and the light bulb sockets 68 extend through a tube 76, which extends through and is mounted on the bottom surface 16a of the bowl 16 and the supporting flanges 12d of the base 12. Above the bottom surface 16a of the bowl 16, the wires 74 extend through liquid impervious insulation sleeves 78.

In the use of the fountain 10, a beverage 80 is placed in the lower bowl 16. As the bowl 16 is filled, the beverage 80 flows through the holes 41 in the bottom portion 38a of the cover post 38 into the interior of the cover post 38 to the inlet openings 30a of the pump 30. The plug of the cable 72 is inserted in an electrical outlet and the switch 62 is turned on to start the pump 30. The pump 30 pumps the beverage 80 through the outlet part 30b, the tube 36, and pipe 32 into the hole 52 in the rod 50. The pressure of the pump 30 forces the beverage through the holes 54 in the rod 50 and into the cup 48. When the cup 48 becomes filled with the beverage, the beverage overflows into the upper bowl 42. The beverage then passes through the spouts 46 so as to flow in separate streams down into the lower bowl 16. The beverage is then recirculated. This path of flow of the beverage is shown by the arrows in FIG. 2. Although the beverage is forced out of the holes 54 in the rod 50 under the pressure of the pump 30, the outer wall 48b of the cup 48 confines this flow of the beverages and prevents the beverage from splashing out of the upper bowl 42. Thus, the fountain 10 provides a continuous flow of the beverage but without any splashing of the beverage.

The various sheet metal parts of the fountain 10, i.e., the base 12, bowl 16, cover post 38, bowl 42, cup 48, dome 56 and dish 58, can be chromium, silver or gold plated or anodized to provide them with a finish of any desired color to enhance the appearance of the fountain. When the fountain 10 is in use, the dish 58 at the top of the fountain can be filled with flowers or fruit for decorative affect. Also during the use of the fountain, the light from the light bulbs 66 and 70 which can be of different colors, shines through the openings 14 and 40 in the base 12 and cover post 38 respectively for additional decorative affect.

Referring to FIG. 5 there is shown another form of the fountain of the present invention. The fountain is identical to the fountain 10 shown in FIGS. 1 and 2 except for the rod 50 and the parts mounted thereon. Instead of the rod 50, a tube 82 is threaded on the top end of the pipe 32 and extends vertically upwardly from the pipe. A hemispherical dome 84 of a transparent or semi-transparent material, such as glass or a plastic, extends over the end of the tube 82 is mounted on the upper beverage bowl 42 with the rim of the dome 84 fitting tightly in the rim of the bowl 42. A dish 86 is seated on the top of the dome 84 and is secured thereto by a bolt and nut 88 and 90.

In the use of this form of the fountain, the pump forces the beverage through the pipe 32 and then through the tube 82. The tube 82 directs the flow of the beverage against the inner surface of the dome 84 and the top of the dome. The beverage hits the inner surface of the dome 84 and is spread out to impinge upon and flow along the inner surface of the dome 84 into the bowl 42. This flow of the beverage is indicated by the arrows in FIG. 5. Thus, the dome 84 not only confines the flow of the beverage to prevent the beverage from splashing out of the bowl 42, but also provides an additional decorative affect by forming the dome shaped flow pattern of the beverage. If desired, the dome can be filled with ice to help cool the beverage. The dish 86 can be filled with flowers or fruit for additional decorative effect.

Thus, there is provided by the present invention a beverage fountain which provides a continuous, recirculating flow of the beverage in the form of a fountain but without any splashing of the beverage. In addition the fountain is decorative in appearance and is capable of being further decorated with flowers, fruit and colored lights. Although the fountain is shown as having only two beverage bowls, it can have any number of additional beverage bowls mounted in spaced relation between the bottom bowl and the top bowl with each bowl having means for allowing the beverage flow therein from the next uppermost bowl to flow in a stream or stream to the next lower bowl.

What is claimed is:

1. A beverage fountain comprising a plurality of bowls mounted in spaced relation one above the other, means for pumping the beverage from the bottommost bowl to an upper bowl, and means for confining the flow of the beverage into the said upper bowl to prevent the beverage from splashing out of said upper bowl, said bowls being of decreasing size from the largest bottommost bowl, each of the bowls above the bottommost bowl including means for permitting the beverage to flow therefrom into the next lower bowl, said pumping means including a pipe extending through the center of the bottom of said bowl, a pump mounted in the bottommost bowl and a tube connecting the outlet of the pump to the bottom end of the pipe, said confining means including a cup seated in the bottom of said upper bowl with said pipe extending through the bottom of the cup, and means over said pipe to direct the flow of the beverage into said cup.

2. A beverage fountain in accordance with claim 1 in which the means for directing the flow of the beverage into the cup comprises a rod having a blind hole in one end thereof and a plurality of spaced holes extending radially therethrough to said blind holes, said rod being mounted on the upper end of the pipe so that the beverage will flow from the pipe through the blind hole and the radial holes in the rod into the cup.

3. A beverage fountain in accordance with claim 2 including a dome member seated on and secured to the top end of the rod and having an outer wall extending downwardly to the cup and surrounding the rod.

4. A beverage fountain in accordance with claim 3 including a dish seated on and secured to the top of the rod.

5. A beverage fountain in accordance with claim 1 in which the uppermost bowl has an engaging rim, and said confining means includes a hemispherical dome extending over the upper end of the pipe with the rim of the dome fitting into the engaging rim of said uppermost bowl.

6. A beverage fountain in accordance with claim 5 in which the dome is of a transparent or semi-transparent material.

7. A beverage fountain in accordance with claim 6 including a tube mounted on the upper end of the pipe rod extending vertically upwardly to the top of the dome so as to direct the flow of the beverage from the pipe to the inner surface of the dome at the top of the dome.

8. A beverage fountain in accordance with claim 7 including a dish seated on and secured to the top of the dome.

9. A beverage fountain comprising a plurality of bowls mounted in spaced relation one above the other, means for pumping the beverage from the bottommost bowl to an upper bowl, and means for confining the flow of the beverage to the said upper bowl to prevent the beverage from splashing out of said upper bowl, said bowls being of decreasing size from the largest bottommost bowl, each of the bowls above the bottommost bowl including means for permitting the beverage to flow therefrom into the next lower bowl, said pumping means including a pipe extending through the center of the bottom of said upper bowl, a pump mounted in the bottommost bowl and a tube connecting the outlet of the pump to the bottom end of the pipe, and including a hollow base on which its bottommost bowl is mounted and a cover post between the bottommost bowl and the upper bowl, said cover post surrounding the pump, the pipe and the tube.

10. A beverage fountain in accordance with claim 9 including light means in the base and the upper end of the cover post and openings in the base and the cover post through which the light from the light means can shine.

* * * * *